United States Patent
de Carufel (10) Patent No.: US 11,804,894 B2
(45) Date of Patent: Oct. 31, 2023

(54) SYSTEM AND METHOD FOR FACILITATING AUTONOMOUS SATELLITE LEVEL COMMUNICATIONS

(71) Applicant: Cognitive Space, Manvel, TX (US)

(72) Inventor: Guy de Carufel, Manvel, TX (US)

(73) Assignee: Cognitive Space, Manvel, TX (US)

( * ) Notice: Subject to any disclaimer, the term of this patent is extended or adjusted under 35 U.S.C. 154(b) by 262 days.

(21) Appl. No.: 17/503,406

(22) Filed: Oct. 18, 2021

(65) Prior Publication Data

US 2022/0123830 A1     Apr. 21, 2022

Related U.S. Application Data

(60) Provisional application No. 63/092,698, filed on Oct. 16, 2020.

(51) Int. Cl.
| | | |
|---|---|---|
| H04B 7/185 | (2006.01) | |
| H04W 24/02 | (2009.01) | |
| G06N 3/02 | (2006.01) | |

(52) U.S. Cl.
CPC .......... H04B 7/18519 (2013.01); G06N 3/02 (2013.01); H04B 7/18513 (2013.01); H04W 24/02 (2013.01)

(58) Field of Classification Search
CPC ........... H04B 7/18513; H04B 7/18519; H04W 24/02; G06N 3/02
See application file for complete search history.

(56) References Cited

U.S. PATENT DOCUMENTS

| 10,659,148 B2 | 5/2020 | Spire | |
| 10,892,818 B2 * | 1/2021 | Lee | H04B 7/18513 |

(Continued)

FOREIGN PATENT DOCUMENTS

| CN | 108966352 B | 9/2019 |
| CN | 111835403 A | 10/2020 |
| WO | 2020183182 A1 | 9/2020 |

OTHER PUBLICATIONS

Towards the Automated Operations of Large Distributed Satellite Systems. Part 2: Classications and Tools; Mohamed Khalil Ben-Larbi, Kattia Flores Pozoc, Mirue Choic, Tom Hayloke, Benjamin Grzesika, Andreas Haasb, Dominik Krupkeb, Harald Konstanskic, Volker Schausa, Sandor P. Feketeb, Christian Schurigd, Enrico Stoll; Sep. 2020; https://www.researchgate.net/publication/344050681_Towards_the_Automated_Operations_of_Large_Distributed_Satellite_Systems_Part_2_Classification_and_Tools.

*Primary Examiner* — Raymond S Dean
(74) *Attorney, Agent, or Firm* — Jason C. Cameron (57) ABSTRACT

A system and method for facilitating autonomous satellite level communications is disclosed. The method includes receiving a request from a user to transmit satellite information captured by a source satellite from the source satellite to a destination node via one or more intermediate satellites. The method further includes receiving one or more input parameters and determining a plurality of states corresponding to the source satellite and the one or more intermediate satellites. Further, the method includes generating a plurality of actions and an expected reward value for each of the plurality of actions. Furthermore, the method includes determining an optimal action among the plurality of actions and outputting the optimal action to the source satellite and the one or more intermediate satellites, one or more user devices or a combination thereof for transmission of the satellite information from the source satellite to the destination node.

20 Claims, 4 Drawing Sheets

(56) References Cited

U.S. PATENT DOCUMENTS

| | | | |
|---|---|---|---|
| 11,239,905 B2* | 2/2022 | Trutna | H04B 7/18521 |
| 11,463,158 B2* | 10/2022 | Devaraj | H04B 7/18584 |
| 2011/0313645 A1* | 12/2011 | Shukla | G08G 5/065 |
| | | | 701/120 |
| 2017/0150060 A1* | 5/2017 | Herz | G06Q 30/0643 |
| 2017/0192095 A1* | 7/2017 | Jobanputra | H04B 7/18517 |
| 2018/0278323 A1* | 9/2018 | Trutna | H04B 7/18513 |
| 2021/0303290 A1* | 9/2021 | Schmit | G06F 9/45558 |

* cited by examiner

SYSTEM AND METHOD FOR FACILITATING AUTONOMOUS SATELLITE LEVEL COMMUNICATIONS

This Application claims priority from a Provisional patent application filed in the United States of America having Patent Application No. 63/092,698, filed on Oct. 16, 2020, and titled "SYSTEM AND METHOD FOR SATELLITE LEVEL COMMUNICATIONS".

FIELD OF INVENTION

Embodiments of the present disclosure relate to satellite level communications and more particularly relates to a system and a method for facilitating autonomous satellite level communications.

BACKGROUND

A satellite is an object in space that orbits around a bigger object. Satellites provide information and services to support global communications, economy, security and defense, safety and emergency management, environment, health and the like. However, a single satellite is unable to provide an acceptable level of service for satellite level communications. Therefore, a satellite constellation is used to provide a near-global coverage and significant improvement in temporal and spatial coverage. The satellite constellation requires the satellite level communications. The main purpose of satellite level communications is to relay signals quickly between satellites that are out of range of ground stations via a mesh network of relay satellites, providing a multitude of relay options. Moreover, communication relay satellite constellations improves resiliency in communication options and allows for greater volume of data transmission and speed in data transmission from source satellites collecting large amount of data for remote sensing.

With the advancements in technology, multiple conventional systems are available for establishing the satellite level communications and planning the satellite constellations by using various rudimentary heuristic algorithms through human satellite operators, which requires significant human intervention and management. Further, conventional systems also fail to dynamically leverage available network capacity through multi-path relay options by considering one or more factors, such as current data traffic across the network, geometric relative states of the satellites with respect to each other, relative states of the satellites with respect to the ground station and the like. Thus, the conventional systems transmit less amount of data to the ground station.

Hence, there is a need for a system and method for facilitating autonomous satellite level communications across space networks in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating autonomous satellite level communications is disclosed. The computing system includes one or more hardware processors and a memory coupled to the one or more hardware processors. The memory includes a plurality of modules in the form of programmable instructions executable by the one or more hardware processors. The plurality of modules include a data receiver module configured to receive a request from a user to transmit satellite information captured by a source satellite from the source satellite to a destination node via one or more intermediate satellites. The satellite information includes at least one or combination of: remote sensing data, health and status telemetry, payload data, relayed data from a remote device, relayed data from a separate satellite, ground data and command transmission. The destination node is one of: a ground station, a satellite and a vehicle. The data receiver module is also configured to receive one or more input parameters from at least one of: the user and one or more external sources based on the received request. The plurality of modules also include a data management module configured to determine a plurality of states corresponding to the source satellite and the one or more intermediate satellites based on the received request and the one or more input parameters by using a trained communication evaluation based Artificial Neural Network (ANN) model. The data management module is also configured to generate a plurality of actions corresponding to the source satellite and the one or more intermediate satellites by applying the determined plurality of states to the trained communication evaluation based ANN model. The plurality of actions include: a plurality of communication paths for transmission of the satellite information from the source satellite to the destination node, types of the plurality of communication paths and specific configurations for each of the plurality of communication paths. Each of the plurality of communication paths includes a plurality of communication links between each of the source satellite and the one or more intermediate satellites. Further, the data management module is configured to generate an expected reward value for each of the generated plurality of actions by applying the received request, the one or more input parameters and the plurality of states to a trained maximum search based ANN model. The data management module is configured to determine an optimal action among the generated plurality of actions based on the generated expected reward value of each of the plurality of actions by using the trained maximum search based ANN model. The expected reward value associated with the optimal action corresponds to a higher expected reward value. The plurality of modules further include a data output module configured to output the determined optimal action to at least one of: the source satellite and the one or more intermediate satellites and one or more user devices associated with the user for transmission of the satellite information from the source satellite to the destination node.

In accordance with another embodiment of the present disclosure, a method for facilitating autonomous satellite level communications is disclosed. The method includes receiving a request from a user to transmit satellite information captured by a source satellite from the source satellite to a destination node via one or more intermediate satellites. The satellite information includes at least one or combination of: remote sensing data, health and status telemetry, payload data, relayed data from a remote device, relayed data from a separate satellite, ground data and command transmission. The destination node is one of: a ground station, a satellite and a vehicle. The method also receiving one or more input parameters from at least one of: the user and one or more external sources based on the received request. The method further includes determining a plurality of states corresponding to the source satellite and the one or more intermediate satellites based on the received request and the one or more input parameters by using a trained communication evaluation based Artificial Neural Network (ANN) model. Further, the method includes generating a plurality of actions corresponding to the source satellite and the one or more intermediate satellites by applying the determined plurality of states to the trained communication evaluation based ANN model. The plurality of actions include: a plurality of communication paths for transmission of the satellite information from the source satellite to the destination node, types of the plurality of communication paths and specific configurations for each of the plurality of communication paths. Each of the plurality of communication paths includes a plurality of communication links between each of the source satellite and the one or more intermediate satellites. Also, the method includes generating an expected reward value for each of the plurality of actions by applying the received request, the one or more input parameters and the plurality of states to a trained maximum search based ANN model. The method includes determining an optimal action among the plurality of actions based on the generated expected reward value of each of the plurality of actions by using the trained maximum search based ANN model. The expected reward value associated with the optimal action corresponds to a higher expected reward value. Furthermore, the method includes outputting the determined optimal action to at least one of: the source satellite and the one or more intermediate satellites and one or more user devices associated with the user for transmission of the satellite information from the source satellite to the destination node.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
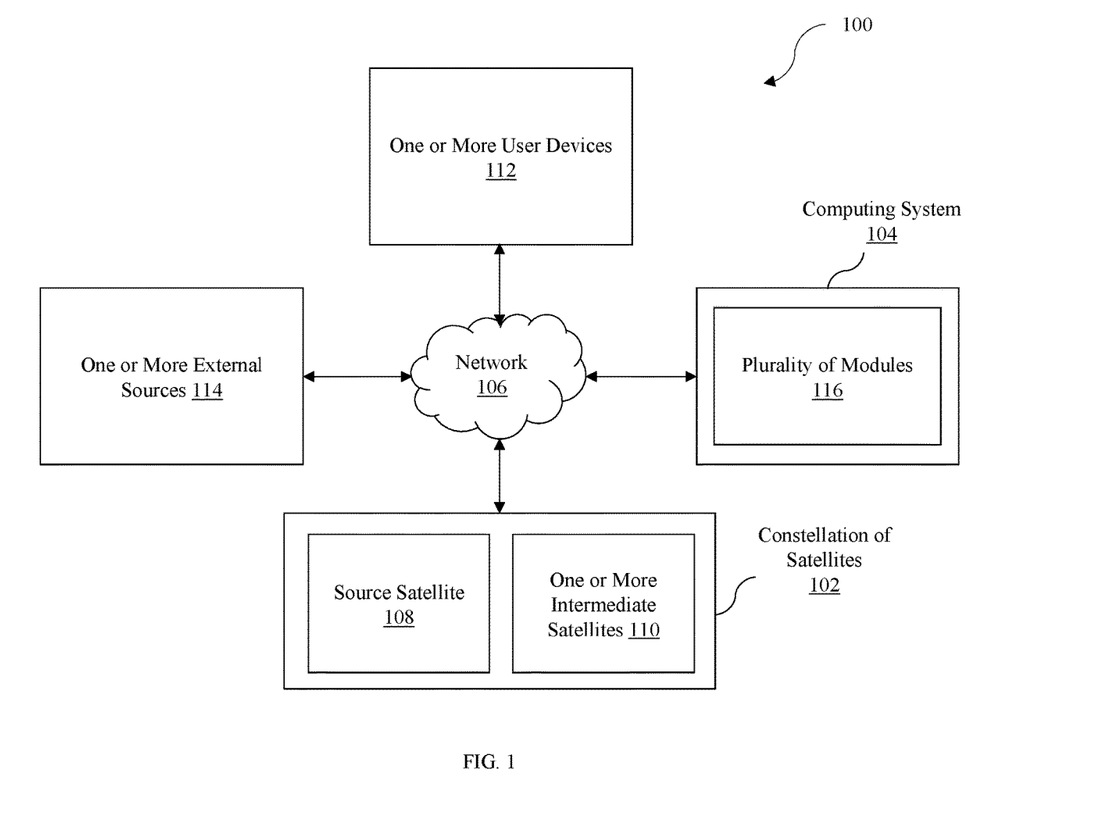
FIG. 1 is a block diagram illustrating an exemplary computing environment for facilitating autonomous satellite level communications, in accordance with an embodiment of the present disclosure.

FIG. 1 is a block diagram illustrating an exemplary computing environment 100 for facilitating autonomous satellite level communications, in accordance with an embodiment of the present disclosure. According to FIG. 1, the computing environment 100 includes a constellation of satellites 102 communicatively coupled to a computing system 104 via a network 106. As used herein, the term 'constellation of satellites 102' refers to a group of artificial satellites working together as a system. In an embodiment of the present disclosure, the constellation of satellites 102 include source satellite 108 and one or more intermediate satellites 110. The constellation of satellites 102 are configured to transmit satellite information captured by the source satellite 108 from the source satellite 108 to a destination node via the one or more intermediate satellites 110. In an exemplary embodiment of the present disclosure, the satellite information include remote sensing data, health and status telemetry, payload data, or relayed data from a remote device or separate satellite or ground data or command transmission or a combination thereof. In an exemplary embodiment of the present disclosure, the destination node is a ground station, a satellite or a vehicle. In an exemplary embodiment of the present disclosure, the network 106 may be internet or any other wireless network. Further, the computing system 104 may be hosted on a central server, such as cloud server or a remote server. In another embodiment of the present disclosure, the computing system 104 may be hosted on the constellation of satellites 102. In yet another embodiment of the present disclosure, the computing system 104 may be partially hosted on the computing system 104 and partially hosted on the constellation of satellites 102. For example, training of Artificial Neural Network (ANN) models may be performed on the computing system 104 and once the ANN models are trained, application of the trained ANN models to determine a plurality of states corresponding to the source satellite 108 and the one or more intermediate satellites 110, generate a plurality of actions, generate an expected reward value for each of the generated plurality of actions may be performed at the constellation of satellites 102.

Further, the computing environment 100 includes one or more user devices 112 associated with a user communicatively coupled to the computing system 104 via the network 106. The user may be a satellite operator. The one or more user devices 112 may be used by the user to generate a request for the computing system 104 to transmit the satellite information captured by the source satellite 108 from the source satellite 108 to the destination node via the one or more intermediate satellites 110. The one or more user devices 112 may also be used by the user to receive an optimal action for transmission of the satellite information. Furthermore, the user may also use the one or more user devices 112 to provide one or more input parameters to the computing system 104. In an exemplary embodiment of the present disclosure, the one or more user devices 112 may include a laptop computer, desktop computer, tablet computer, smartphone, wearable device, smart watch and the like. Further, the computing environment 100 includes one or more external sources 114 configured to transmit the one or more input parameters to the computing system 104. In an exemplary embodiment of the present disclosure, the one or more external sources 114 may be external databases configured to transmit the one or more input parameters to the computing system 104. Details on the one or more input parameters have been elaborated in subsequent paragraphs of the present description with reference to FIG. 2.

Further, the one or more user devices 112 include a local browser, a mobile application or a combination thereof. Furthermore, the user may use a web application via the local browser, the mobile application or a combination thereof to communicate with the computing system 104. The user may use the computing system 104 to receive the optimal action to be executed at the constellation of satellites 102. The optimal action may be executed autonomously onboard the satellite or via user command. The computing system 104 includes a plurality of modules 116. Details on the plurality of modules 116 have been elaborated in subsequent paragraphs of the present description with reference to FIG. 2.

In an embodiment of the present disclosure, the computing system 104 is configured to receive the request from the user to transmit the satellite information captured by the source satellite 108 from the source satellite 108 to the destination node via the one or more intermediate satellites 110. The computing system 104 receives the one or more input parameters from the user, one or more external sources 114 or a combination thereof based on the received request. Further, the computing system 104 also determines a plurality of states corresponding to the source satellite 108 and the one or more intermediate satellites 110 based on the received request and the one or more input parameters by using a trained communication evaluation based Artificial Neural Network (ANN) model. The computing system 104 generates a plurality of actions corresponding to the source satellite 108 and the one or more intermediate satellites 110 by applying the determined plurality of states to the trained communication evaluation based ANN model. Furthermore, the computing system 104 generates the expected reward value for each of the generated plurality of actions by applying the received request, the one or more input parameters and the plurality of states to a trained maximum search based ANN model. The computing system 104 determines the optimal action among the generated plurality of actions based on the generated expected reward value of each of the plurality of actions by using the trained maximum search based ANN model. The computing system 104 outputs the determined optimal action to the source satellite 108 and the one or more intermediate satellites 110, the one or more user devices 112 or a combination thereof associated with the user for transmission of the satellite information from the source satellite 108 to the destination node.

Figure 2:
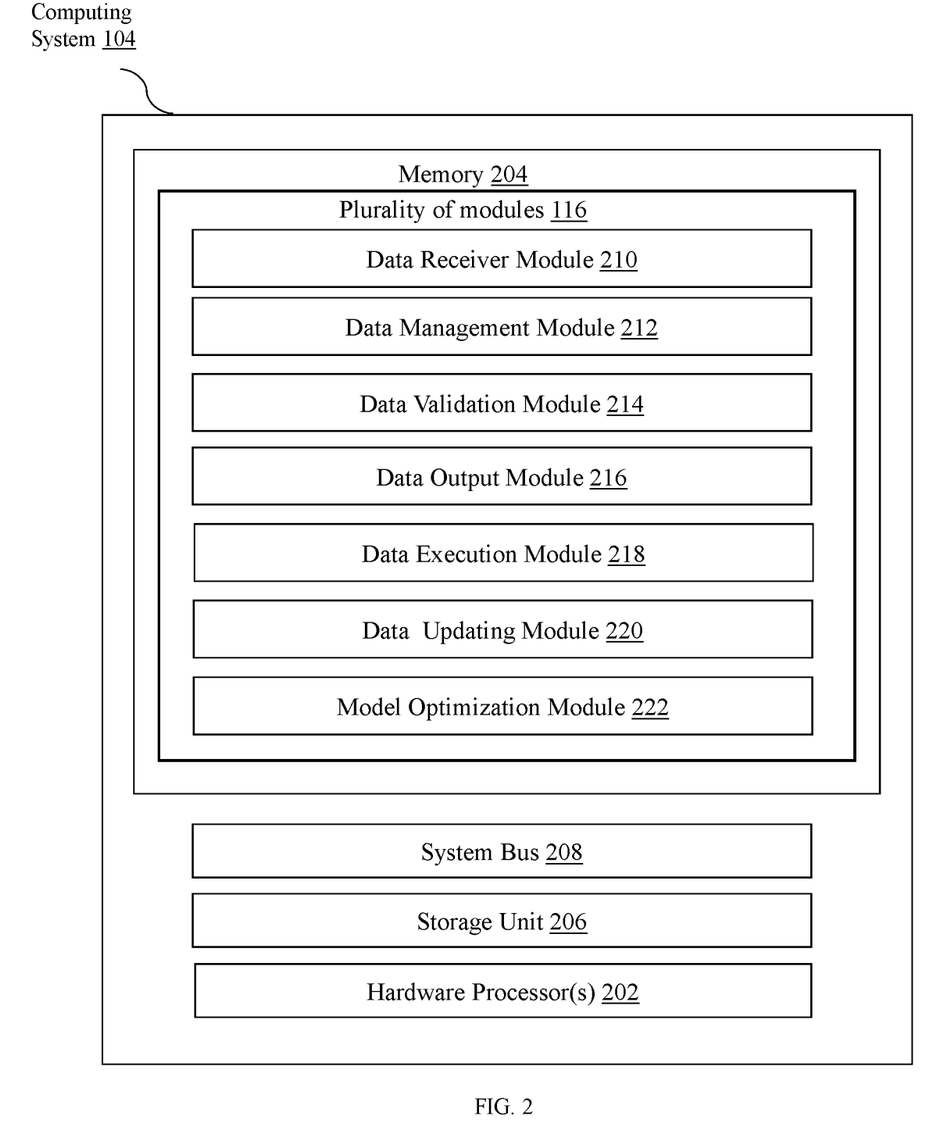
FIG. 2 is a block diagram illustrating an exemplary computing system, such as those shown in FIG. 1, for facilitating the autonomous satellite level communications, in accordance with an embodiment of the present disclosure.

FIG. 2 is a block diagram illustrating an exemplary computing system 104, such as those shown in FIG. 1, for facilitating autonomous satellite level communications. The computing system 104 comprises one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 116 in the form of programmable instructions executable by the one or more hardware processors 202. Further, the plurality of modules 116 includes a data receiver module 210, a data management module 212, a data validation module 214, a data output module 216, a data execution module 218, a data updating module 220 and a model optimization module 222.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 116 stored in the form of machine-readable instructions on any of the above-mentioned storage media and may be in communication with and executed by the one or more hardware processors 202.

The storage unit 206 may be a cloud storage. The storage unit 206 may store the one or more input parameters, the plurality of states corresponding to the source satellite 108 and the one or more intermediate satellites 110, the plurality of actions and the expected reward value for each of the generated plurality of actions. The storage unit 206 may also store one or more predefined simulation rules and error in the expected reward value.

The data receiver module 210 is configured to receive the request from the user to transmit the satellite information captured by the source satellite 108 from the source satellite 108 to the destination node via the one or more intermediate satellites 110. In an exemplary embodiment of the present disclosure, the destination node is a ground station, a satellite or a vehicle. The user may be the satellite operator. In an exemplary embodiment of the present disclosure, the satellite information may include remote sensing data, health and status telemetry, payload data, or relayed data from a remote device or separate satellite or ground data or command transmission or a combination thereof. Further, the request includes geometry of the satellite constellation, types of the source satellite 108 and the one or more intermediate satellites 110, length of a planning window, desired medium of transmission of the satellite information, type of the satellite information, priority of the information to be transmitted or any combination thereof. As used herein, the term 'constellation of satellites 102' refers to a group of artificial satellites working together as a system. In an embodiment of the present disclosure, the constellation of satellites 102 include the source satellite 108 and the one or more intermediate satellites 110. In an embodiment of the present disclosure, the planning window includes a window of time over which the plurality of actions is generated to be performed by the satellite constellation. In an embodiment of the present disclosure, the desired medium of transmitting the satellite information from the source satellite 108 to the destination node may correspond to different frequencies and channels. In an exemplary embodiment of the present disclosure, the medium may be an optical channel or Radio Frequency (RF) channel.

Further, the data receiver module 210 is configured to receive the one or more input parameters from the user, the one or more external sources 114 or a combination thereof based on the received request. In an exemplary embodiment of the present disclosure, the one or more external sources 114 may be the external databases configured to transmit the one or more input parameters to the computing system 104. In an exemplary embodiment of the present disclosure, the one or more input parameters may include information about intermediate satellites in proximity to each of the one or more intermediate satellites 110, the source satellite 108 and the destination node, geometric relative state of the source satellite 108 with respect to the one or more intermediate satellites 110, geometric relative states of the one or more intermediate satellites 110 with respect to each other, availability of one or more terminals corresponding to each of the one or more intermediate satellites 110 and the source satellite 108, relative states of the source satellite 108 and the one or more intermediate satellites 110 with respect to the destination node, relative state of intermediate destination satellite with respect to destination satellite, orbital location of each of the one or more intermediate satellites 110, the source satellite 108 and the destination node or any combination thereof. The destination satellite is a final intermediate satellite which transmits the satellite information to the destination node. An intermediate satellite may also act as the destination and omit transmission to the ground station. In an embodiment of the present disclosure, the orbital location of each of the one or more intermediate satellites 110, the source satellite 108 and the destination node may be considered in case of restricted access for data transmission. In an embodiment of the present disclosure, the one or more terminals may be required for transmitting the satellite information from the source satellite 108 to the destination node. For example, in case of optical processing, a physical terminal is required for the transmission of the satellite information.

The data management module 212 is configured to determine the plurality of states corresponding to the source satellite 108 and the one or more intermediate satellites 110 based on the received request and the one or more input parameters by using the trained communication evaluation based Artificial Neural Network (ANN) model. In an embodiment of the present disclosure, the plurality of states and the planning window may be initialized. In an exemplary embodiment of the present disclosure, the plurality of states may include memory availability, power availability, antenna availability, current data traffic within the source satellite 108 and each of the one or more intermediate satellites 110 and the like. In an embodiment of the present disclosure, the data management module 212 generates the plurality of actions corresponding to the source satellite 108 and the one or more intermediate satellites 110 by applying the determined plurality of states to the trained communication evaluation based ANN model. In an exemplary embodiment of the present disclosure, the plurality of actions include a plurality of communication paths for transmission of the satellite information from the source satellite 108 to the destination node, types of the plurality of communication paths and specific configurations for each of the plurality of communication paths. In an embodiment of the present disclosure, each of the plurality of communication paths includes a plurality of communication links between each of the source satellite 108 and the one or more intermediate satellites 110. For example, when there are two intermediate satellites for transmission of the satellite information from the source satellite 108 to the destination node, first communication path may be transmitting the satellite information from the source satellite 108 to a first intermediate satellite, from the first intermediate satellite to a second intermediate satellite and from the second intermediate satellite to the destination node. Further, second communication path may be transmitting the satellite information from the source satellite 108 to the second intermediate satellite, from the second intermediate satellite to the first intermediate satellite and from the first intermediate satellite to the destination node.

In an alternate embodiment of the present disclosure, in generating the plurality of actions corresponding to the source satellite 108 and the one or more intermediate satellites 110 by applying the determined plurality of states to the trained communication evaluation based ANN model, the data management module 212 generates a communication link between a first satellite and a second satellite by applying the determined plurality of states to the trained communication evaluation based ANN model. The first satellite may be the source satellite 108 or the one or more intermediate satellites 110. Similarly, the second satellite may be the source satellite 108 or the one or more intermediate satellites 110. In an embodiment of the present disclosure, the data management module 212 generates the communication link between the first satellite and the second satellite until the satellite information is transmitted to the destination node. For example, when there are two intermediate satellites for transmission of the satellite information from the source satellite 108 to the destination node, first communication link may be transmitting the satellite information from the source satellite 108 to a first intermediate satellite. Further, second communication link may be transmitting the satellite information from the first intermediate satellite to a second intermediate satellite. Similarly, third communication link may be transmitting the satellite information from the second intermediate satellite to the destination node.

Further, the data management module 212 generates the expected reward value for each of the generated plurality of actions by applying the received request, the one or more input parameters and the plurality of states to the trained maximum search based ANN model. In an embodiment of the present disclosure, the expected reward value is based on one or more reward metrics. In an exemplary embodiment of the present disclosure, the one or more reward metrics include shortened latency to transmit the data from the source satellite to the destination node, reduced number of the one or more intermediate satellites 110 required to transmit the satellite information, amount of data transmitted to the destination node and the like.

The data validation module 214 is configured to validate the generated expected reward value for each of the plurality of actions in a simulation environment.

Furthermore, the data management module 212 determines the optimal action among the generated plurality of actions based on the generated expected reward value of each of the plurality of actions by using the trained maximum search based ANN model. In an embodiment of the present disclosure, the optimal action is determined for a time step of the planning window. The expected reward value associated with the optimal action corresponds to a higher expected reward value. In an embodiment of the present disclosure, the trained communication evaluation based ANN model and the trained maximum search based ANN model may work in conjunction by stepping through the planning window at a constant step size. In an embodiment of the present disclosure, the optimal action may be executed autonomously onboard the satellite or via user command.

The data output module 216 is configured to output the determined optimal action to the source satellite 108 and the one or more intermediate satellites 110, the one or more user devices 112 associated with the user or a combination thereof for transmission of the satellite information from the source satellite 108 to the destination node. In an exemplary embodiment of the present disclosure, the one or more user devices 112 108 may include a laptop computer, desktop computer, tablet computer, smartphone, wearable device, smart watch and the like.

The data execution module 218 is configured to execute the determined optimal action at the source satellite 108, the one or more intermediate satellites 110 or a combination thereof to transmit the satellite information from the source satellite 108 to the destination node based on the optimal action.

The data updating module 220 is configured to determine a set of dynamic states corresponding to the one or more intermediate satellites 110 based on the received request and the one or more input parameters by using the trained communication evaluation based ANN model. In an exemplary embodiment of the present disclosure, the set of dynamic states may include memory availability, power availability, antenna availability and current data traffic within each of the one or more intermediate satellites 110. Further, the data updating module 220 updates the determined optimal action based on the determined set of dynamic states by using the trained maximum search based ANN model. In an embodiment of the present disclosure, the determined optimal action is updated upon transmission of the satellite information to an intermediate satellite among the one or more intermediary satellites.

In an embodiment of the present disclosure, before using the trained communication evaluation based ANN model and the trained maximum search based ANN model, communication evaluation based ANN model and maximum search based ANN model is required to be trained. The communication evaluation based ANN model is trained based on the received request and the one or more input parameters to determine the plurality of states corresponding to the source satellite 108 and the one or more intermediate satellites 110. The communication evaluation based ANN model is also trained based on the plurality of states to generate the plurality of actions corresponding to the source satellite 108 and the one or more intermediate satellites 110. Further, the maximum search based ANN model is trained based on the received request, the received one or more input parameters and the plurality of states to generate the expected reward value for each of the plurality of actions.

The model optimization module 222 is configured to generate an actual reward value upon executing the determined optimal action at the source satellite 108, the one or more intermediate satellites 110 or any combination thereof by using the trained maximum search based ANN model. Further, the model optimization module 222 computes an error in the expected reward value corresponding to the optimal action based on difference between the expected reward value and the actual reward value by using the trained maximum search based ANN model. The model optimization module 222 updates learning of the trained maximum search based ANN model based on the computed error by using reinforcement learning. In an embodiment of the present disclosure, the trained maximum search based ANN model updates ANN weights via backpropagation based on the computed error. In an embodiment of the present disclosure, the error may be computed by comparing the actual reward value with the expected reward value. This error is then fed into a back-propagation algorithm, such that gradient of the trained maximum search algorithm may be updated based on the computed error. The term 'back-propagation algorithm' refers to a widely used algorithm in training feedforward neural networks for supervised learning. The learning of the trained maximum search based ANN model is updated for one or more training sessions until a desired expected reward value is achieved based on the computed error. In an embodiment of the present disclosure, during each of the one or more training sessions, exploitation-exploration technique may be used. As used herein, the term 'exploitation' refers to autonomous action selection by using the trained maximum search based ANN model, such that the action selected by the trained maximum search based ANN model is the optimal action. The term "exploration" refers to the selection of a random action among the plurality of actions, such that the reward value associated with the selected random action may be more as compared to the optimal action and used to update the optimal action through training. In an embodiment of the present disclosure, the one or more training sessions include concurrent execution of one or more simulation episodes from a start time to an end time. The one or more simulation episodes represents a certain number of consecutive time steps between the start time and the end time. Further, the model optimization module 222 generates an updated expected reward value for each of the plurality of actions by applying the received request and the one or more input parameters to the updated trained maximum search based ANN model. The model optimization module 222 determines a different action among the plurality of actions based on the updated expected reward value of each of the plurality of action by using the updated trained maximum search based ANN model.

Figure 3:
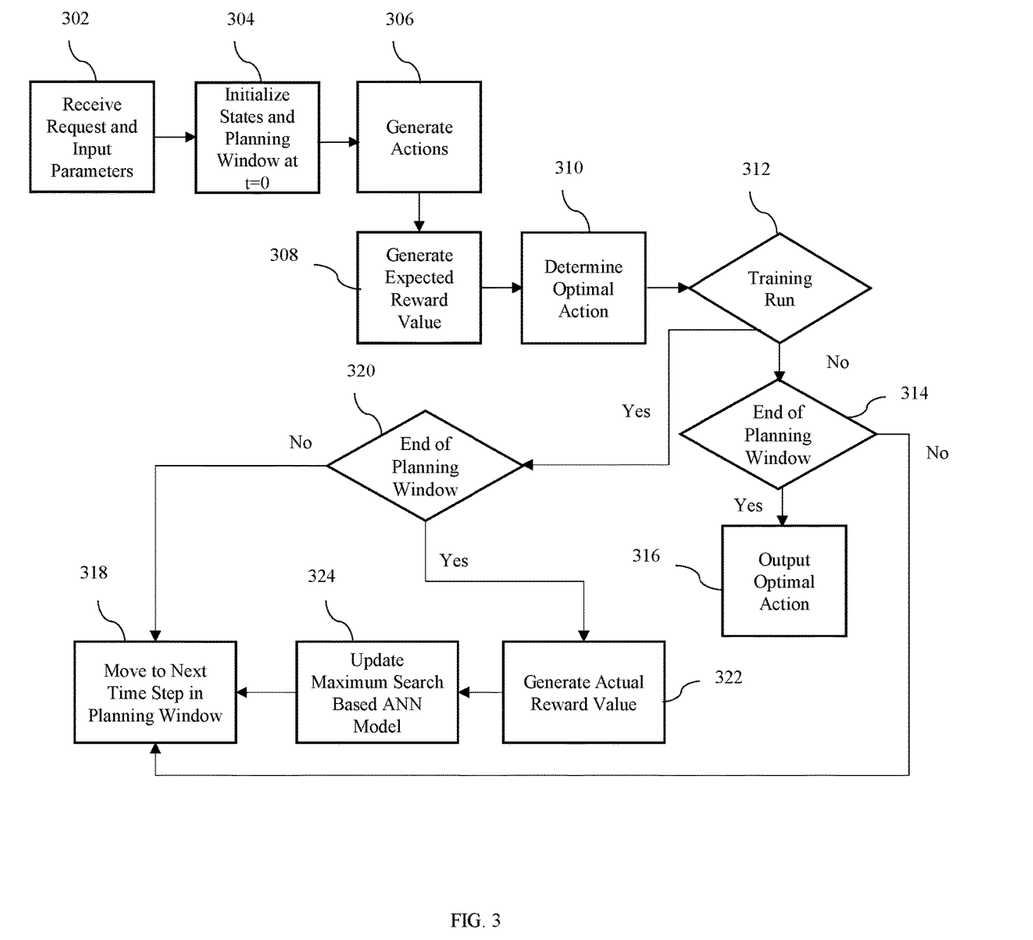
FIG. 3 is a flowchart illustrating operation of the exemplary computing system to facilitate the autonomous satellite level communications, in accordance with an embodiment of the present disclosure.

FIG. 3 is a flowchart illustrating operation of the exemplary computing system 104 to facilitate the autonomous satellite level communications, in accordance with an embodiment of the present disclosure. At step 302, the computing system 104 receives the request from the user to transmit the satellite information from the source satellite 108 to the destination node and receives the one or more input parameters from the user, the one or more external sources 114 or a combination thereof. Further, the computing system 104 determines the plurality of states corresponding to the source satellite 108 and the one or more intermediate satellites 110 based on the received request and the one or more input parameters by using the trained communication evaluation based ANN model. At step 304, the computing system 104 initializes the plurality of states and the planning window associated with the source satellite 108 and the one or more intermediate satellites 110 at 't=0'. Furthermore, at step 306, the computing system 104 generates the plurality of actions corresponding to the source satellite 108 and the one or more intermediate satellites 110 by applying the determined plurality of states to the trained communication evaluation based ANN model. At step 308, the computing system 104 generates the expected reward value for each of the generated plurality of actions by applying the received request, the one or more input parameters and the plurality of states to the trained maximum search based ANN model. At step 310, the computing system 104 determines the optimal action among the generated plurality of actions based on the generated expected reward value of each of the plurality of actions by using the trained maximum search based ANN model. In an embodiment of the present disclosure, the optimal action may be executed autonomously onboard the satellite or via user command.

At step 312, it may be determined if one or more training sessions are performed. When the one or more training sessions are not performed, at step 314, it may be determined if the planning window has reached the end. When the planning window has reached the end, at step 316, the computing system 104 outputs the optimal action to the source satellite 108 and the one or more intermediate satellites 110, the one or more user devices 112 associated with the user or a combination thereof for transmission of the satellite information from the source satellite 108 to the destination node for the planning window. When the planning window has not reached the end, at step 318, the computing system 104 moves to next time step in the planning window. Further, when the one or more training sessions are not performed, at step 320, it may be determined if the planning window has reached the end. When the planning window has reached the end, at step 322, the computing system 104 generates the actual reward value. Further, the computing system 104 computes the error in the expected reward value. At step 324, the computing system 104 updates learning of the trained maximum search based ANN model based on the computed error by using reinforcement learning. Furthermore, at step 318, the computing system 104 moves to next time step in the planning window. When the planning window has not reached the end, at step 318, the computing system 104 moves to next time step in the planning window.

Figure 4:
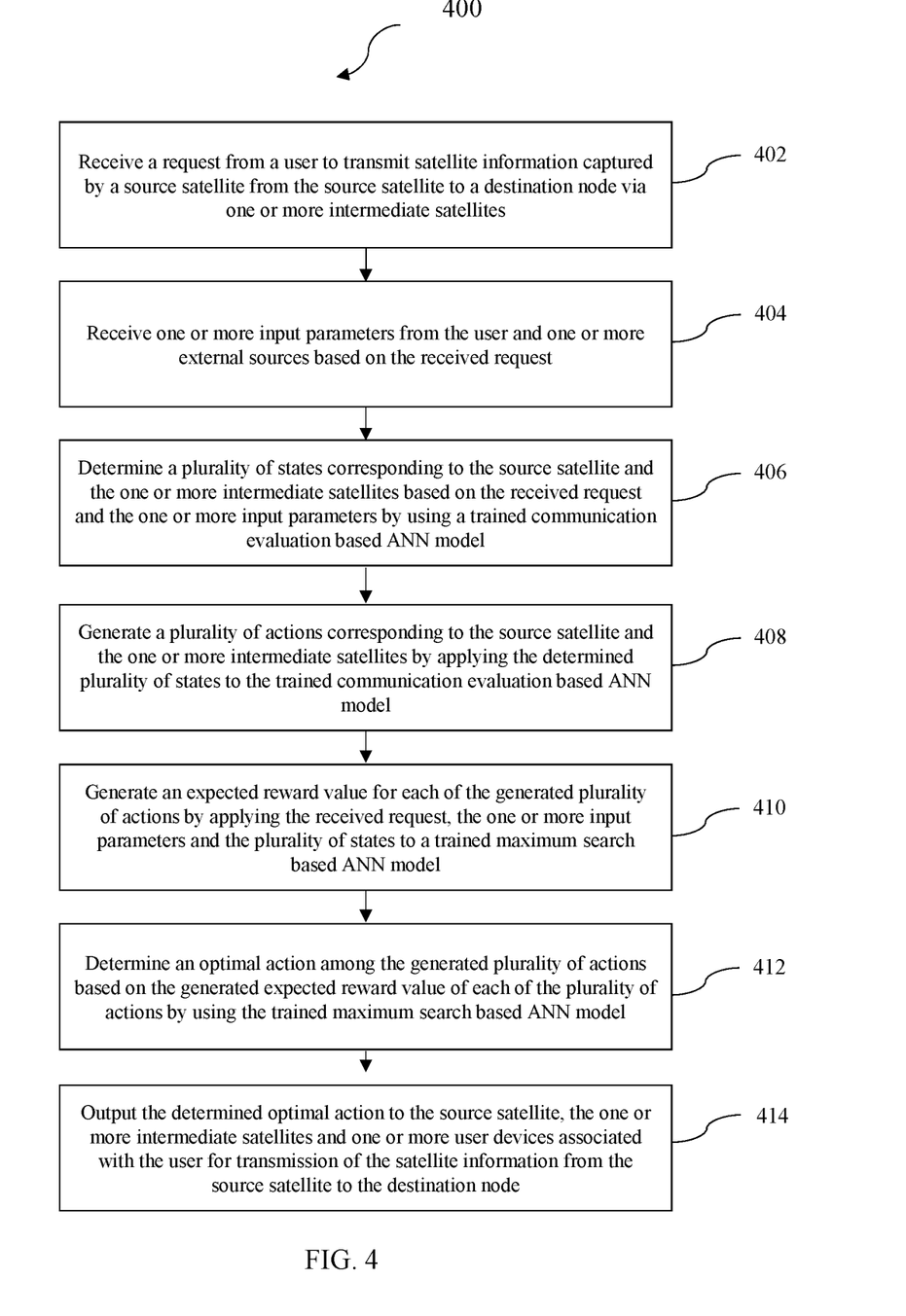
FIG. 4 is a process flow diagram illustrating an exemplary method for facilitating the autonomous satellite level communications, in accordance with an embodiment of the present disclosure.

FIG. 4 is a process flow diagram illustrating an exemplary method for facilitating the autonomous satellite level communications, in accordance with an embodiment of the present disclosure. At step 402, a request is received from a user to transmit satellite information captured by a source satellite 108 from the source satellite 108 to a destination node via one or more intermediate satellites 110. In an exemplary embodiment of the present disclosure, the destination node is a ground station, a satellite or a vehicle. The user may be a satellite operator. In an exemplary embodiment of the present disclosure, the satellite information may include remote sensing data, health and status telemetry, payload data, or relayed data from a remote device or separate satellite or ground data or command transmission or a combination thereof. Further, the request includes geometry of satellite constellation, types of the source satellite 108 and the one or more intermediate satellites 110, length of a planning window, desired medium of transmission of the satellite information, type of the satellite information, priority of the information to be transmitted or any combination thereof. As used herein, the term 'constellation of satellites 102' refers to a group of artificial satellites working together as a system. In an embodiment of the present disclosure, the constellation of satellites 102 include the source satellite 108 and the one or more intermediate satellites 110. In an embodiment of the present disclosure, the planning window includes a window of time over which a plurality of actions is generated to be performed by the satellite constellation. In an embodiment of the present disclosure, the desired medium of transmitting the satellite information from the source satellite 108 to the destination node may correspond to different frequencies and channels.

In an exemplary embodiment of the present disclosure, the medium may be an optical channel or Radio Frequency (RF) channel.

At step 404, one or more input parameters is received from the user, one or more external sources 114 or a combination thereof based on the received request. In an exemplary embodiment of the present disclosure, the one or more external sources 114 may be external databases configured to transmit the one or more input parameters. In an exemplary embodiment of the present disclosure, the one or more input parameters may include information about intermediate satellites in proximity to each of the one or more intermediate satellites 110, the source satellite 108 and the destination node, geometric relative state of the source satellite 108 with respect to the one or more intermediate satellites 110, geometric relative states of the one or more intermediate satellites 110 with respect to each other, availability of one or more terminals corresponding to each of the one or more intermediate satellites 110 and the source satellite 108, relative states of the source satellite 108 and the one or more intermediate satellites 110 with respect to the destination node, relative state of intermediate destination satellite with respect to destination satellite, orbital location of each of the one or more intermediate satellites 110, the source satellite 108 and the destination node or any combination thereof. The destination satellite is a final intermediate satellite which transmits the satellite information to the destination node. An intermediate satellite may also act as the destination and omit transmission to the ground station. In an embodiment of the present disclosure, the orbital location of each of the one or more intermediate satellites 110, the source satellite 108 and the destination node may be considered in case of restricted access for data transmission. In an embodiment of the present disclosure, the one or more terminals may be required for transmitting the satellite information from the source satellite 108 to the destination node. For example, in case of optical processing, a physical terminal is required for the transmission of the satellite information.

At step 406, a plurality of states are determined corresponding to the source satellite 108 and the one or more intermediate satellites 110 based on the received request and the one or more input parameters by using a trained communication evaluation based Artificial Neural Network (ANN) model. In an embodiment of the present disclosure, the plurality of states and the planning window may be initialized. In an exemplary embodiment of the present disclosure, the plurality of states may include memory availability, power availability, antenna availability, current data traffic within the source satellite 108 and each of the one or more intermediate satellites 110 and the like.

At step 408, a plurality of actions are generated corresponding to the source satellite 108 and the one or more intermediate satellites 110 by applying the determined plurality of states to the trained communication evaluation based ANN model. In an exemplary embodiment of the present disclosure, the plurality of actions include a plurality of communication paths for transmission of the satellite information from the source satellite 108 to the destination node, types of the plurality of communication paths and specific configurations for each of the plurality of communication paths. In an embodiment of the present disclosure, each of the plurality of communication paths includes a plurality of communication links between each of the source satellite 108 and the one or more intermediate satellites 110.

In an alternate embodiment of the present disclosure, in generating the plurality of actions corresponding to the source satellite 108 and the one or more intermediate satellites 110 by applying the determined plurality of states to the trained communication evaluation based ANN model, the method 400 includes generating a communication link between a first satellite and a second satellite by applying the determined plurality of states to the trained communication evaluation based ANN model. The first satellite may be the source satellite 108 or the one or more intermediate satellites 110. Similarly, the second satellite may be the source satellite 108 or the one or more intermediate satellites 110. In an embodiment of the present disclosure, the communication link between the first satellite and the second satellite may be generated until the satellite information is transmitted to the destination node.

At step 410, an expected reward value for each of the generated plurality of actions is generated by applying the received request, the one or more input parameters and the plurality of states to the trained maximum search based ANN model. In an embodiment of the present disclosure, the expected reward value is based on one or more reward metrics. In an exemplary embodiment of the present disclosure, the one or more reward metrics include shortened latency to transmit the data from the source satellite to the destination node, reduced number of the one or more intermediate satellites 110 required to transmit the satellite information, amount of data transmitted to the destination node and the like.

Further, the method 400 includes validating the generated expected reward value for each of the plurality of actions in a simulation environment.

At step 412, the optimal action is determined among the generated plurality of actions based on the generated expected reward value of each of the plurality of actions by using the trained maximum search based ANN model. In an embodiment of the present disclosure, the optimal action is determined for a time step of the planning window. The expected reward value associated with the optimal action corresponds to a higher expected reward value. In an embodiment of the present disclosure, the trained communication evaluation based ANN model and the trained maximum search based ANN model may work in conjunction by stepping through the planning window at a constant step size.

At step 414, the determined optimal action is outputted to the source satellite 108 and the one or more intermediate satellites 110, the one or more user devices 112 associated with the user or a combination thereof for transmission of the satellite information from the source satellite 108 to the destination node. In an exemplary embodiment of the present disclosure, the one or more user devices 112 may include a laptop computer, desktop computer, tablet computer, smartphone, wearable device, smart watch and the like.

Further, the method 400 includes executing the determined optimal action at the source satellite 108, the one or more intermediate satellites 110 or a combination thereof to transmit the satellite information from the source satellite 108 to the destination node based on the optimal action.

Furthermore, the method 400 includes determining a set of dynamic states corresponding to the one or more intermediate satellites 110 based on the received request and the one or more input parameters by using the trained communication evaluation based ANN model. In an exemplary embodiment of the present disclosure, the set of dynamic states may include memory availability, power availability, antenna availability and current data traffic within each of the one or more intermediate satellites 110. Further, the method 400 includes updating the determined optimal action based on the determined set of dynamic states by using the trained maximum search based ANN model. In an embodiment of the present disclosure, the determined optimal action is updated upon transmission of the satellite information to an intermediate satellite among the one or more intermediary satellites.

In an embodiment of the present disclosure, before using the trained communication evaluation based ANN model and the trained maximum search based ANN model, communication evaluation based ANN model and maximum search based ANN model is required to be trained. The communication evaluation based ANN model is trained based on the received request and the one or more input parameters to determine the plurality of states corresponding to the source satellite 108 and the one or more intermediate satellites 110. The communication evaluation based ANN model is also trained based on the plurality of states to generate the plurality of actions corresponding to the source satellite 108 and the one or more intermediate satellites 110. Further, the maximum search based ANN model is trained based on the received request, the received one or more input parameters and the plurality of states to generate the expected reward value for each of the plurality of actions.

Further, the method 400 includes generating an actual reward value upon executing the determined optimal action at the source satellite 108, the one or more intermediate satellites 110 or any combination thereof by using the trained maximum search based ANN model. The method 400 includes computing an error in the expected reward value corresponding to the optimal action based on difference between the expected reward value and the actual reward value by using the trained maximum search based ANN model. The method also 400 includes updating learning of the trained maximum search based ANN model based on the computed error by using reinforcement learning. In an embodiment of the present disclosure, the trained maximum search based ANN model updates ANN weights via backpropagation based on the computed error. In an embodiment of the present disclosure, the error may be computed by comparing the actual reward value with the expected reward value. This error is then fed into a back-propagation algorithm, such that gradient of the trained maximum search algorithm may be updated based on the computed error. The term 'back-propagation algorithm' refers to a widely used algorithm in training feedforward neural networks for supervised learning. The learning of the trained maximum search based ANN model is updated for one or more training sessions until a desired expected reward value is achieved based on the computed error. In an embodiment of the present disclosure, during each of the one or more training sessions, exploitation-exploration technique may be used. As used herein, the term 'exploitation' refers to autonomous action selection by using the trained maximum search based ANN model, such that the action selected by the trained maximum search based ANN model is the optimal action. The term "exploration" refers to the selection of a random action among the plurality of actions, such that the reward value associated with the selected random action may be more as compared to the exploitation action, resulting in a new optimal action to learn from. In an embodiment of the present disclosure, the one or more training sessions include concurrent execution of one or more simulation episodes from a start time to an end time. The one or more simulation episodes represents a certain number of consecutive time steps between the start time and the end time. Further, the method 400 includes generating an updated expected reward value for each of the plurality of actions by applying the received request and the one or more input parameters to the updated trained maximum search based ANN model. The method 400 includes determining a different action among the plurality of actions based on the updated expected reward value of each of the plurality of action by using the updated trained maximum search based ANN model.

The method 400 may be implemented in any suitable hardware, software, firmware, or combination thereof.

Thus, various embodiments of the present computing system 104 provide a solution to facilitate the autonomous satellite level communications. The computing system 104 automatically determines the optimal action plan having the maximum expected reward value without human interruption. Further, the computing system 104 is capable of transmitting data from the source satellite 108 to the destination node more effectively and at a greater rate by leveraging the optimal path of transmission across the network of satellite nodes. The computing system 104 dynamically determines the optimal action for transmission of the satellite information.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for facilitating autonomous satellite level communications, the computing system comprising:
one or more hardware processors; and
a memory coupled to the one or more hardware processors, wherein the memory comprises a plurality of modules in the form of programmable instructions executable by the one or more hardware processors, wherein the plurality of modules comprises:
a data receiver module configured to:
receive a request from a user to transmit satellite information captured by a source satellite from the source satellite to a destination node via one or more intermediate satellites, wherein the satellite information comprises at least one or combination of: payload data, satellite state information, relayed data from a remote devise, relayed data from a separate satellite, remote sensing data, health and status telemetry, ground data and command transmission, wherein the destination node is one of: a ground station, a satellite and a vehicle;
receive one or more input parameters from at least one of: the user and one or more external sources based on the received request;
a data management module configured to:
determine a plurality of states corresponding to the source satellite and the one or more intermediate satellites based on the received request and the one or more input parameters by using a trained communication evaluation based Artificial Neural Network (ANN) model;
generate a plurality of actions corresponding to the source satellite and the one or more intermediate satellites by applying the determined plurality of states to the trained communication evaluation based ANN model, wherein the plurality of actions comprise: a plurality of communication paths for transmission of the satellite information from the source satellite to the destination node, types of the plurality of communication paths and specific configurations for each of the plurality of communication paths and wherein each of the plurality of communication paths comprises a plurality of communication links between each of the source satellite and the one or more intermediate satellites;
generate an expected reward value for each of the generated plurality of actions by applying the received request, the one or more input parameters and the plurality of states to a trained maximum search based ANN model;
determine an optimal action among the generated plurality of actions based on the generated expected reward value of each of the plurality of actions by using the trained maximum search based ANN model, wherein the expected reward value associated with the optimal action corresponds to a higher expected reward value; and
a data output module configured to output the determined optimal action to at least one of: the source satellite and the one or more intermediate satellites and one or more user devices associated with the user for transmission of the satellite information from the source satellite to the destination node.

2. The computing system of claim 1, wherein the one or more input parameters comprise at least one or combination of: information about intermediate satellites in proximity to each of the one or more intermediate satellites, the source satellite and the destination node, geometric relative state of the source satellite with respect to the one or more intermediate satellites, geometric relative states of the one or more intermediate satellites with respect to each other, availability of one or more terminals corresponding to each of the one or more intermediate satellites and the source satellite, relative states of the source satellite and the one or more intermediate satellites with respect to the destination node, relative state of intermediate destination satellite with respect to destination satellite and orbital location of each of the one or more intermediate satellites, the source satellite and the destination node.

3. The computing system of claim 1, wherein in generating the plurality of actions corresponding to the source satellite and the one or more intermediate satellites by applying the determined plurality of states to the trained communication evaluation based ANN model, the data management module is configured to generate a communication link between a first satellite and a second satellite by applying the determined plurality of states to the trained communication evaluation based ANN model.

4. The computing system of claim 1, further comprises a data updating module configured to:
determine a set of dynamic states corresponding to the one or more intermediate satellites based on the received request and the one or more input parameters by using the trained communication evaluation based ANN model, wherein the set of dynamic states comprise: memory availability, power availability, antenna availability and current data traffic within each of the one or more intermediate satellites; and
update the determined optimal action based on the determined set of dynamic states by using the trained maximum search based ANN model, wherein the determined optimal action is updated upon transmission of the satellite information to an intermediate satellite among the one or more intermediary satellites.

5. The computing system of claim 1, wherein the expected reward value is based on one or more reward metrics, wherein the one or more reward metrics comprise: shortened latency to transmit the data from the source satellite to the destination node, reduced number of the one or more intermediate satellites required to transmit the satellite information and amount of data transmitted to the destination node.

6. The computing system of claim 1, further comprises a data execution module configured to execute the determined optimal action at the at least one of: the source satellite and the one or more intermediate satellites to transmit the satellite information from the source satellite to the destination node based on the optimal action.

7. The computing system of claim 1, further comprises a data validation module configured to validate the generated expected reward value for each of the plurality of actions in a simulation environment.

8. The computing system of claim 1, further comprises a model optimization module configured to:
generate an actual reward value upon executing the determined optimal action at the at least one of: the source satellite and the one or more intermediate satellites by using the trained maximum search based ANN model;
compute an error in the expected reward value corresponding to the optimal action based on difference between the expected reward value and the actual reward value by using the trained maximum search based ANN model;
update learning of the trained maximum search based ANN model based on the computed error by using reinforcement learning; wherein the trained maximum search based ANN model updates ANN weights via backpropagation based on the computed error, wherein the learning of the trained maximum search based ANN model is updated for one or more training sessions until a desired expected reward value is achieved based on the computed error and wherein the one or more training sessions comprise: concurrent execution of one or more simulation episodes from a start time to an end time;
generate an updated expected reward value for each of the plurality of actions by applying the received request and the one or more input parameters to the updated trained maximum search based ANN model; and
determine a different action among the plurality of actions based on the updated expected reward value of each of the plurality of actions by using the updated trained maximum search based ANN model.

9. The computing system of claim 1, wherein the request comprises at least one or combination of: geometry of a satellite constellation, types of the source satellite and the one or more intermediate satellites, length of a planning window, desired medium of transmission of the satellite information, type of the satellite information and priority of the information to be transmitted.

10. The computing system of claim 1, wherein the plurality of states comprise: memory availability, power availability, antenna availability and current data traffic within the source satellite and each of the one or more intermediate satellites.

11. A method for facilitating autonomous satellite level communications, the method comprising:
receiving, by one or more hardware processors, a request from a user to transmit satellite information captured by a source satellite from the source satellite to a destination node via one or more intermediate satellites, wherein the satellite information comprises at least one or combination of: payload data, satellite state information, relayed data from a remote devise, relayed data from a separate satellite, remote sensing data, health and status telemetry, ground data and command transmission, wherein the destination node is one of: a ground station, a satellite and a vehicle;
receiving, by the one or more hardware processors, one or more input parameters from at least one of: the user and one or more external sources based on the received request;
determining, by the one or more hardware processors, a plurality of states corresponding to the source satellite and the one or more intermediate satellites based on the received request and the one or more input parameters by using a trained communication evaluation based Artificial Neural Network (ANN) model;
generating, by the one or more hardware processors, a plurality of actions corresponding to the source satellite and the one or more intermediate satellites by applying the determined plurality of states to the trained communication evaluation based ANN model, wherein the plurality of actions comprise: a plurality of communication paths for transmission of the satellite information from the source satellite to the destination node, types of the plurality of communication paths and specific configurations for each of the plurality of communication paths and wherein each of the plurality of communication paths comprises a plurality of communication links between each of the source satellite and the one or more intermediate satellites;

generating, by the one or more hardware processors, an expected reward value for each of the plurality of actions by applying the received request, the one or more input parameters and the plurality of states to a trained maximum search based ANN model;

determining, by the one or more hardware processors, an optimal action among the plurality of actions based on the generated expected reward value of each of the plurality of actions by using the trained maximum search based ANN model, wherein the expected reward value associated with the optimal action corresponds to a higher expected reward value; and outputting, by the one or more hardware processors, the determined optimal action to at least one of: the source satellite and the one or more intermediate satellites and one or more user devices associated with the user for transmission of the satellite information from the source satellite to the destination node.

12. The method of claim 11, wherein the one or more input parameters comprise at least one or combination of: information about intermediate satellites in proximity to each of the one or more intermediate satellites, the source satellite and the destination node, geometric relative state of the source satellite with respect to the one or more intermediate satellites, geometric relative states of the one or more intermediate satellites with respect to each other, availability of one or more terminals corresponding to each of the one or more intermediate satellites and the source satellite, relative states of the source satellite and the one or more intermediate satellites with respect to the destination node, relative state of intermediate destination satellite with respect to destination satellite and orbital location of each of the one or more intermediate satellites, the source satellite and the destination node.

13. The method of claim 1, wherein generating the plurality of actions corresponding to the source satellite and the one or more intermediate satellites by applying the determined plurality of states to the trained communication evaluation based ANN model comprises generating a communication link between a first satellite and a second satellite by applying the determined plurality of states to the trained communication evaluation based ANN model.

14. The method of claim 1, further comprises:
determining a set of dynamic states corresponding to the one or more intermediate satellites based on the received request and the one or more input parameters by using the trained communication evaluation based ANN model, wherein the set of dynamic states comprise: memory availability, power availability, antenna availability and current data traffic within each of the one or more intermediate satellites; and updating the determined optimal action based on the determined set of dynamic states by using the trained maximum search based ANN model, wherein the determined optimal action is updated upon transmission of the satellite information to an intermediate satellite among the one or more intermediary satellites.

15. The method of claim 11, wherein the expected reward value is based on one or more reward metrics, wherein the one or more reward metrics comprise: shortened latency to transmit the data from the source satellite to the destination node, reduced number of the one or more intermediate satellites required to transmit the satellite information and amount of data transmitted to the destination node.

16. The method of claim 11, further comprises executing the determined optimal action at the at least one of: the source satellite and the one or more intermediate satellites to transmit the satellite information from the source satellite to the destination node based on the optimal action.

17. The method of claim 11, further comprises validating the generated expected reward value for each of the plurality of actions in a simulation environment.

18. The method of claim 11, further comprises:
generating an actual reward value upon executing the determined optimal action at the at least one of: the source satellite and the one or more intermediate satellites by using the trained maximum search based ANN model;

computing an error in the expected reward value corresponding to the optimal action based on difference between the expected reward value and the actual reward value by using the trained maximum search based ANN model;

updating learning of the trained maximum search based ANN model based on the computed error by using reinforcement learning; wherein the trained maximum search based ANN model updates ANN weights via backpropagation based on the computed error, wherein the learning of the trained maximum search based ANN model is updated for one or more training sessions until a desired expected reward value is achieved based on the computed error and wherein the one or more training sessions comprise: concurrent execution of one or more simulation episodes from a start time to an end time;

generating an updated expected reward value for each of the plurality of actions by applying the received request and the one or more input parameters to the updated trained maximum search based ANN model; and determining a different action among the plurality of actions based on the updated expected reward value of each of the plurality of actions by using the updated trained maximum search based ANN model.

19. The method of claim 11, wherein the request comprises at least one or combination of: geometry of a satellite constellation, types of the source satellite and the one or more intermediate satellites, length of a planning window, desired medium of transmission of the satellite information, type of the satellite information and priority of the information to be transmitted.

20. The method of claim 11, wherein the plurality of states comprise: memory availability, power availability, antenna availability and current data traffic within the source satellite and each of the one or more intermediate satellites.

* * * * *